(12) United States Patent
Mitra et al.

(10) Patent No.: US 11,146,651 B2
(45) Date of Patent: Oct. 12, 2021

(54) REQUEST REDIRECTION IN AN INFORMATION CENTRIC NETWORK

(71) Applicant: Telefonaktiebolaget LM Ericsson (publ), Stockholm (SE)

(72) Inventors: Nilo Mitra, New York, NY (US); Börje Ohlman, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 468 days.

(21) Appl. No.: 16/314,052

(22) PCT Filed: Sep. 6, 2016

(86) PCT No.: PCT/EP2016/070935
§ 371 (c)(1),
(2) Date: Dec. 28, 2018

(87) PCT Pub. No.: WO2018/001533
PCT Pub. Date: Jan. 4, 2018

(65) Prior Publication Data
US 2021/0227039 A1    Jul. 22, 2021

Related U.S. Application Data

(60) Provisional application No. 62/357,631, filed on Jul. 1, 2016.

(51) Int. Cl.
*H04L 29/08* (2006.01)
*H04L 9/30* (2006.01)
*H04L 9/32* (2006.01)

(52) U.S. Cl.
CPC .......... *H04L 67/2814* (2013.01); *H04L 9/30* (2013.01); *H04L 9/3236* (2013.01); *H04L 67/02* (2013.01); *H04L 67/327* (2013.01)

(58) Field of Classification Search
CPC ..... H04L 67/2814; H04L 9/30; H04L 9/3236; H04L 67/02; H04L 67/327
See application file for complete search history.

(56) References Cited

U.S. PATENT DOCUMENTS

| 2015/0280984 | A1* | 10/2015 | Mahadevan | H04L 45/04 709/222 |
| 2016/0164952 | A1* | 6/2016 | Tur Nyi | H04L 67/10 709/219 |
| 2019/0149603 | A1* | 5/2019 | Wood | H04L 67/327 709/217 |

FOREIGN PATENT DOCUMENTS

| EP | 2 928 118 A1 | 10/2015 |
| WO | 2016/089272 A1 | 6/2016 |

OTHER PUBLICATIONS

International Search Report and Written Opinion dated Mar. 29, 2017 issued in International Application No. PCT/EP2016/070935. (8 pages).

(Continued)

*Primary Examiner* — Arvin Eskandarnia
(74) *Attorney, Agent, or Firm* — Rothwell, Figg, Ernst & Manbeck, P.C.

(57) ABSTRACT

There is provided a method in a serving node of an information centric network, the method comprising: receiving an interest message referring to a first content object from a requesting node; processing the name of the first content object and the payload of the received interest message to generate the name of a second content object; and replying to the interest message with a redirect message, wherein the redirect message comprises the name of the second content object.

13 Claims, 6 Drawing Sheets

(56) References Cited

OTHER PUBLICATIONS

Mosko, M. et al., "CCNx Messages in TLV Format (Internet Draft)"; draft-irtf-icnrg-ccnxmessages-01 (2016). (27 pages).
Mosko, M. et al., "CCNx Semantics (Internet Draft)"; draft-irtf-icnrg-ccnxsemantics-01 (2016). (16 pages).
Kutscher, D. et al., "The NetInf Protocol (Internet Draft)"; draft-kutscher-icnrg-netinf-proto-00 (Oct. 4, 2012). (21 pages).

* cited by examiner

REQUEST REDIRECTION IN AN INFORMATION CENTRIC NETWORK

CROSS REFERENCE TO RELATED APPLICATION(S)

This application is a 35 U.S.C. § 371 National Stage of International Patent Application No. PCT/EP2016/070935, filed Sep. 6, 2016, designating the United States and claiming priority to U.S. provisional application No. 62/357,631, filed on Jul. 1, 2016. The above identified applications are incorporated by reference.

TECHNICAL FIELD

The present application relates to a method in a serving node of an information centric network, a serving node of an information centric network, a method in a requesting node of an information centric network, a requesting node of an information centric network, and a computer-readable medium.

BACKGROUND

Information Centric Networking (ICN) [icnrg.org] is a new networking paradigm. Content Centric Networking (CCN) [ccnx.org] is one of several approaches within the ICN paradigm, while Named Data Networking (NDN) [named-data.net] is another. Instead of focusing on connecting communicating endpoints (as traditional networking protocols, such as IP, do), it focuses on the content object that should be retrieved. In ICN networking, messages are routed based on the globally unique names of content objects rather than on endpoint addresses referring to physical boxes (as is the case with TCP/IP). A very brief overview of key features of the CCN embodiment of ICN is provided immediately below.

In CCN, a content object is retrieved by issuing an Interest message to the network containing the name of the content object. Such a message is routed by the network towards the source/publisher of the object. Nodes along the path check if they have a cached copy of the object. If so they will respond to the Interest message with a Content Object message containing the requested content object and the Interest message will not be propagated any further. The routing is helped by making the name a structured name (similar to domain names, but with richer syntax). Routers maintain a Forwarding Information Base (FIB) about where to forward which name or name prefix of an Interest. The routers along the path of the Interest message keep a record of the Interest messages they have forwarded (where it came from and what content object it was naming) in their Pending Interest Table (PIT). If other Interest messages with the same name arrive at the router, it does not forward them but just notes them and the interface over which they arrived in the PIT besides the entry for this name. This is called Interest aggregation, preventing needless propagation upstream of the same Interest. In this way, the PIT entries for the same name may form a tree in the network with receivers at the leaves.

When the Interest message reaches an endpoint (or router) having a copy of the content object (perhaps cached), the Interest message is responded to with a Content Object message, with the content as its payload, and is propagated backwards along the path the Interest message took. The backward path is learned from the entries the Interest message left in the PIT of the routers along the path. If there were multiple Interests arriving at a router for this name, as identified in the PIT, the Content Object message containing the content object is replicated towards each direction where the Interest messages came from.

The Content Object is cached in the Content Store (CS) of an intermediate router, so as to be able to serve future Interests with that name directly from the router rather than forwarding the Interest towards the publisher. After forwarding a Content Object matching a pending Interest, the routers delete the corresponding entry in the PIT; thus these entries are expected to be short-lived. When the original endpoint(s) generating the Interest message(s) receive the Content Object the transaction is considered closed. One benefit of CCN is the ability to send the same information to multiple places in the network. Since routers may cache Content Objects in a Content Store at every router besides forwarding them, Content Objects need not be served from the original publisher and thus traverse the entire network every time a new requester becomes interested in them—a local cached copy suffices. Another advantage with CCN is the aggregation of Interest messages. In the case of a flash crowd event, where suddenly thousands of endpoints request the same content, the source will only be reached by one request for the content, while all other requests will be served from the Content Store caches of routers along the path towards the source.

While the ICN paradigm is elegant, and instantiations such as CCN and NDN reflect this in the protocol design, there are several factors that make such protocols unsuitable when trying to use them to replicate current, well established use cases such as Web-based e-commerce and online advertising. The following is a summary of the problems encountered, the partial solutions that exist to address these, and those aspects of the ICN paradigm that suffer as a consequence.

Same object myth: There is an implicit understanding in ICN literature that there can be multiple requests for a single named object, a movie for example, and much of the design is aimed at making this as efficient as possible. Superficially, this holds for simple objects like an icon image but a less naïve reader knows that what is received depends on who asks, even without the requester's explicit consent. For instance, while there can be multiple requests for the same movie, the actual media object returned to consumers will be different in all real life situations, especially for pay TV. This is because of service level entitlements, which restrict the returned content object to, for example, a SD quality vs HD vs 4K depending on the device (and not trivially its size, but also its trust environment—is a hardware root of trust present? Is it jail broken? etc.), where it is being consumed (perhaps there are specific content blackouts in certain regions), the type of network used (WiFi vs. cellular), etc.

Dynamic content: In classic ICN, requests for content objects only carry the name of the object. In NDN, for instance, everything that needs to be known to obtain the correct object should be carried in the name. However, for most web applications, the returned object is almost always determined by the requester (identity, location, device type, previous state, etc.) and placing all these factors in the name is unwieldy, leading to large FIB and PIT tables in routers. Thus, the name may not be known in advance and therefore made known. Moreover, as the publisher has to dynamically create such named objects and bind their content to the name, this can be processing expensive and perhaps infeasible when thousands of simultaneous requests arrive. Finally, as the name in the Content Object has to be exactly the same as in the Interest, if the metadata and state information were carried in the name, this would needlessly be reflected in the returned Content Object. This is especially true for the state information, which, after interactions with the content producer, is changed—and returning an outdated state seems pointless.

Content redirection: NDN does not offer any redirection mechanism. CCNx offers a tightly constrained redirection mechanism through the use of the LINK object, geared to a certain type of use case. An Interest for a certain named object may be returned by a publisher with a Content Object containing a LINK field, which field contains the new name for the object which should be requested as well as the hash of the specific object to be returned. A new Interest for that name returns the Content Object whose hash matches the one specified. The use case where this type of redirection is possible is when the publisher moves the content to a new location, giving each a new name to allow discovery but does not wish to go through the expensive name-to-content binding through rehashing the content. The content is moved unchanged with its original hash and selected using that hash value provided in the LINK. While this may be a solution for pre-selected, static objects, this does not serve the purpose when the content at the redirected location needs to be dynamically generated. The original publisher would not know how to specify the hash value of the redirected object referred to by the LINK. CCN also does not allow any other data to be included in the payload of the LINK message.

In summary, current ICN design, as exemplified by its two prominent instantiations in CCN and NDN, is very constrained and does not lend itself directly to the support of use cases which represent current and well-established practice in areas such as such as Web-based e-commerce and online advertising. These use cases are of great commercial value and need to be maintained even if the underlying networking technology were changed from IP to ICN. Putting everything in names is unwieldy and impractical when dealing with dynamic content. Adding a payload field partially mitigates this, but prevents aggregation of requests. Finally, there is no obvious mechanism to redirect requests to alternative publishers when the content needs to be dynamically generated.

SUMMARY

There is provided a method in a serving node of an information centric network, the method comprising: receiving an interest message referring to a content object from a requesting node; replying to the interest message with a redirect message, wherein the redirect message comprises the name of another node to which the interest message should be directed. There is further provided a method in a requesting node of an information centric network, the method comprising: sending an interest message referring to a content object to a serving node; receiving a redirect message in reply, wherein the redirect message comprises the name of another node to which the interest message should be directed; and sending a new interest message to the another node.

The general question addressed herein is how to handle redirections of a request (also known as an interest or an Interest message) for a content item towards multiple sources so as to personalize the response to the request, as embodied in currently practice by certain HTTP request parameters. This becomes particularly important for many commercial use cases, especially those associated with e-commerce and online advertising. This document tries to show the simplest possible approach that can address this general question. We explain our solution by using the most common and commercially important application of Web technologies today—online advertising. It contains all the important ingredients of what makes the Web a successful commercial platform, and which features need to be available even if the underlying networking and delivery technology were to change. We do not make a feature-by-feature replacement of HTTP and IP, but try and retain as many aspects of ICN that make sense, adding to it only where it is essential.

The solution includes the following:

1) A method for carrying state information (e.g., "cookies") from the consumer to the publisher. Cookies carry state between the consumer and producer of information, tying multiple requests between them to one another. This is particularly important to handle in the stateless and anonymous ICN interaction paradigm.

2) A method for carrying request metadata (e.g., device type, geo-location, etc.) that can "inform" the creation of the returned content object. This is the equivalent of the various HTTP request headers 3) A method for redirecting the request for a dynamic content object (e.g., an advertising slot) to another publisher, who will create the response based on consumer metadata (items 1 and 2) as well as other factors.

Items 1 and 2 will take advantage of both the name and the payload in an Interest message and describe in detail the actions taken by all entities in handling these fields. Item 3 will be handled by a new data type, REDIRECT, defined as an addition to those already defined for the Content Object in CCN. This new flag indicates a redirection and includes a) the named object to which the received message should be redirected in a new Interest, and; b) a payload field which will carry information relevant to the current and future interactions between the consumer and the publisher. Thus, its syntax, semantics and use are different from those of the CCN-specified LINK flag. A specific use of this new data type is the redirection of an advertising slot on a web page to an ad server, which will provide an advertisement relevant to the end consumer.

A consequence of this solution is that one ICN paradigm—namely request aggregation—is sacrificed. In almost all practical and useful situations, where there is an asymmetry between what is requested and what is received, it is not possible to aggregate requests from multiple users for the "same" object.

Accordingly, there is provided a method in a serving node of an information centric network, the method comprising: receiving an interest message referring to a first content object from a requesting node. The method further comprises processing the name of the first content object and the payload of the received interest message to generate the name of a second content object; and replying to the interest message with a redirect message, wherein the redirect message comprises the name of the second content object.

This allows a node in an information centric network to process a request and redirect the requesting node to another node. The redirection to another node is performed by giving the requesting node a redirect message referencing the name of a second content object, which the network knows to retrieve from the another node. Importantly, neither the name of the first content object nor the name of the second content object need refer to an actual content object, these names are merely required to cause the request to arrive at the serving node. To this end, the content object names may include a unique identifier, such as the hash of the payload to render the requested content object unique and so ensure that the request arrives at a serving node and is not answered from the cache of an intermediate node.

The redirect message may further comprise at least one of: a data field for exchanging information between the serving node and the requesting node; the public key of the publisher of the second content object; and a cryptographic hash of the second content object. The serving node receives interest messages from a requesting node, that requesting node may have received the interest message from another node in a long chain of communication. The originating node is the first requester in the case where there is a chain of redirections. The node that created the first interest message in the communication chain is the originating node. The originating node may be in an ICN-enabled consumer device.

A public key for the publisher of the second content object should be included to authenticate any received response as having been sent from that publisher.

A cryptographic hash of the second content object can be included when the serving node knows what the second content object is. Once the requesting node has received the second content object, from some other node, it can apply the same cryptographic hash function to the received second object and compare this to the cryptographic hash received from the serving node. In this way the second content object can be verified as being the specific one requested. The serving node may not know exactly what the second content object is if the name of the second content object is merely used to carry redirection information to the requesting node and does not refer to an actual object.

The data field for exchanging information between the serving node and the originating node may comprise at least one of: the identity of the requesting node; the identity of the originating node; the capabilities of the originating node; and state information exchanged during the interaction between the requesting node and the serving node.

There is further provided a serving node of an information centric network, the serving node comprising an interface, a processor, and a local content store. The serving node arranged to receive an interest message on the interface, the interest message referring to a first content object and received from a requesting node. The serving node is further arranged to process the name of the first content object and the payload of the received interest message in the processor to generate the name of a second content object. The serving node is further arranged to reply to the interest message via the interface with a redirect message, wherein the redirect message comprises the name of the second content object.

The redirect message may further comprise at least one of: a data field for exchanging information between the serving node and the requesting node; the public key of the publisher of the second content object; and a cryptographic hash of the second content object.

There is further provided a method in a requesting node of an information centric network, the method comprising: sending an interest message referring to a first named content object; receiving a redirect message in reply, wherein the redirect message comprises the name of a second content object; and sending a new interest message to retrieve the second content object.

The received redirect message may further comprise the name of a second content object, the public key of the publisher of the second content object and a cryptographic hash of the second content object. The method may further comprise receiving the second content object from the another node; and using the public key received in the redirect message to authenticate the publisher of the second content object. The method may further comprise receiving the second content object from the another node; and using the cryptographic hash to authenticate verify that the received second content object is the same as the one identified in the received redirect message.

There is further provided a computer-readable medium, carrying instructions, which, when executed by computer logic, causes said computer logic to carry out any of the methods defined herein.

There is further provided a requesting node of an information centric network, the requesting node comprising an interface, and a processor, the requesting node arranged to: send an interest message via the interface, the interest message referring to a first content object; receive via the interface a redirect message in reply to the interest message, wherein the redirect message comprises the name of a second content object; and send a new interest message via the interface, the new interest message referring to the second content object.

The received redirect message may further comprise the name of a content object, the public key of the publisher of the second content object and a cryptographic hash of the second content object, the requesting node further arranged to: receive the second content object from the another node via the interface; and use the cryptographic hash in the processor to verify that the received named content object is the same as the one identified in the received redirect message.

The received redirect message may further comprise the name of a content object and the public key of the publisher of the second content object, the requesting node further arranged to: receive the second content object from the another node via the interface; and use the public key contained in the received redirect message to authenticate the identity of the publisher of the second content object.

There is further provided a method in a serving node of an information centric network, the method comprising: receiving an interest message referring to a named content object from a requesting node; and replying to the interest message with a redirect message, wherein the redirect message comprises the name of another node to which the interest message should be directed.

BRIEF DESCRIPTION OF THE DRAWINGS

A method and apparatus for request redirection will now be described, by way of example only, with reference to the accompanying drawings, in which.

DETAILED DESCRIPTION

The solution presented herein allows the carriage of metadata in a protected manner in a CCN request as it is redirected from a publisher to another entity and repeatedly as appropriate until the personalized content is finally served. Such metadata is essential for determining the response to be sent, which includes determining the next entity to which the redirected Interest should be targeted. In most web applications, much of the returned content is tailored to the requester's preferences, such as the home page, the language etc.

One particular metadata is the concept of HTTP cookies, which are the lifeblood of e-commerce as well as online advertising. When you go to a shopping site, cookies keep you from having to re-authenticate on every page, maintain the contents of your shopping cart, resume from where you left off, etc. Or, to take a streaming example, it allows you to resume your interrupted movie viewing when you come back to it another day. In other words, the two ends maintain state. In current practice, the use of a cookie is closely tied to the URL which sets it and to which it must be returned when the browser returns to it. In advertising, cookies carry state that allow publishers to identify their consumers, and ad networks to determine which ads from what ad campaigns have been shown to the consumer, etc. Without being able to carry such state between requests, web applications as we know them today would not function. The proposed solution shows how such state information can be carried between the relevant entities in an interaction.

Finally, almost all web interactions require multiple redirections from the original page to populate portions of that page with content (text, images, icons etc.) from other sources. These redirections also require state to be carried. In the absence of redirections, there could only be monolithic content objects, which would be cumbersome, unrealistic and infeasible.

Without the methods described in the solution, e-commerce and online advertising would not be possible in an ICN-networked world.

We shall illustrate the solution using the example of a visited web page, e.g., www.nytimes.com, and show the various steps by which the dynamic aspects of the page are populated. This will become the template for our solution, where the underlying technology is changed from HTTP to CCN. Thus, it is important to understand the multiple steps involved in current practice, the better to understand the changes that we seek when we introduce CCN as the networking and delivery protocol.

A web page contains multiple content items, including icons, images, text, Javascript, CSS-based page layout instructions and "slots" for online advertisements. These slots are typically identified by the HTML <iframe> tag, an example of which is as follows: <iframe src="http://ad.doubleclick.net/network_code/adi/first_level_ad_unit/second_level_ad_unit;key=value;tile=tile_number; sz=widthxheight;ord='+ord+'?" width="468" height="60" marginwidth="0" marginheight="0" hspace="0" vspace="0" frameborder="0" scrolling="no"></iframe>

Basically, attributes in the <iframe>identify the ad unit and the position that it will take on the screen, its size and identifies (via the src attribute) the source from which the ad content should be retrieved.

Figure 1:
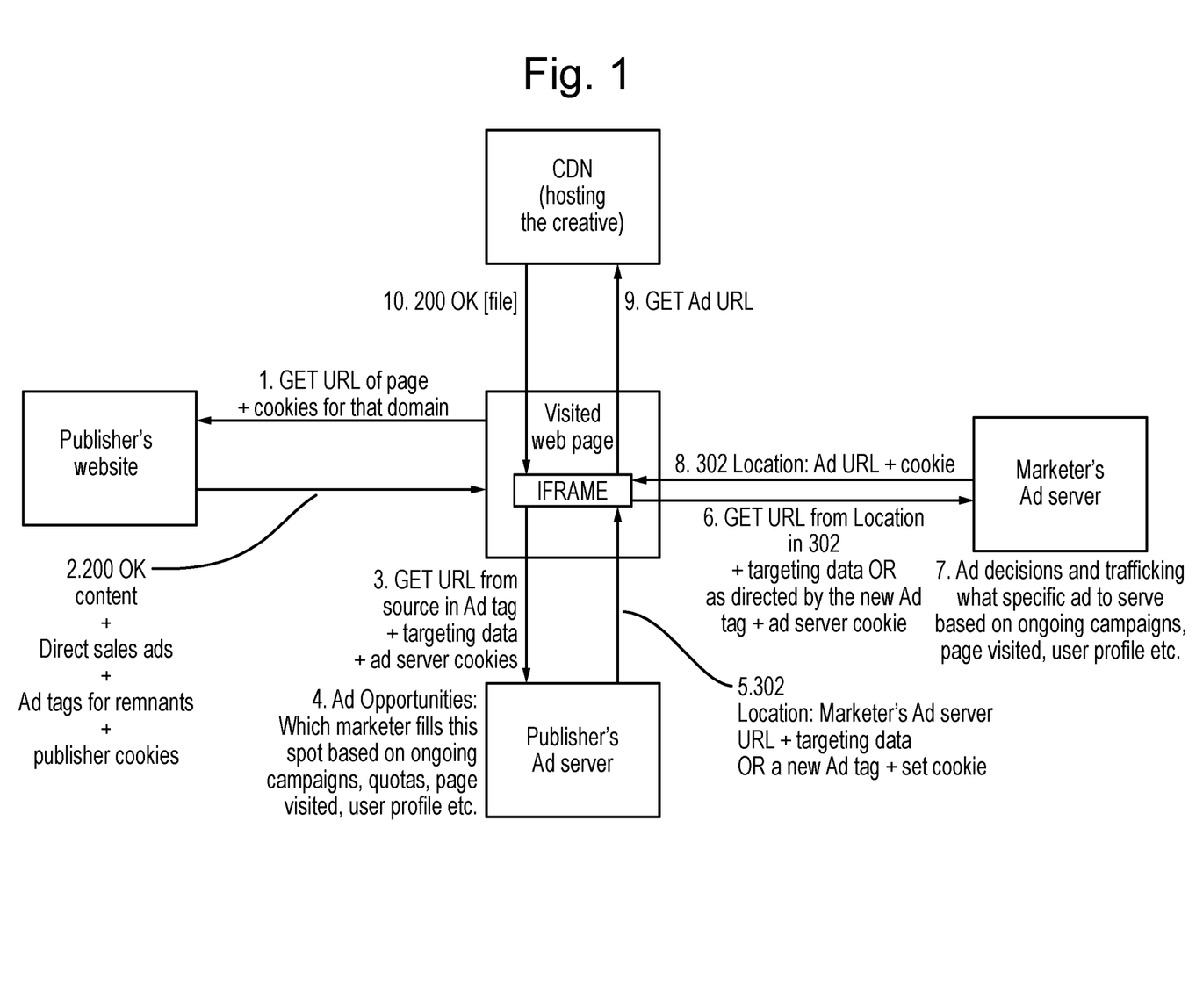
FIG. 1 shows the message flows that are needed to populate a single <iframe> on a web page.

FIG. 1 shows the message flows that are needed to populate a single <iframe> on the web page. Note that there can be multiple <iframe>s on a page.

The key elements in the steps essential to an understanding of the solution presented herein are elaborated on below:

1) An HTTP GET request to a publisher's web site (e.g., www.nytimes.com) causes cookies for the domain nytimes.com to be sent to the publisher. In addition, there may be other HTTP headers identifying the browser used, the consumer's IP address etc.

2) The full page contains icons, images, text, Javascript, CSS-based page layout instructions and "slots" for online advertisements is returned. Each of these individual components of the page may have to be retrieved from different sources. We note only the presence of the ad slots (also called ad tags) carried in <iframe>s, and show a single one.

3) A HTTP GET is used to dereference the source identified in the <iframe>(the ad tag). In advertising, this request is sent to the publisher's ad server, which handles advertising placement on behalf of the publisher. As this is a request to a different domain, any existing cookies for this domain will be sent to the server. This cookie typically identifies (in an anonymised way) the user.

4) The publisher's ad server, acting on the publisher's behalf, identifies ad campaigns which the publisher has promised to fulfil, what quotas from those have been fulfilled, what, per the cookie, the user's profile might be so as to better target the ad placed in this ad slot, etc.

5) Based on these calculations, the publisher's ad server redirects the request with a HTTP 302 to the server for an ad agency (or marketer, in advertising parlance) which is running the chosen campaign that the publisher's ad server has decided is appropriate for this user.

6) As this is another domain to which the browser is being redirected, any saved cookies from this domain (that of the ad agency) is returned to it. This cookie might contain information on which ads this particular user might have seen in past visits etc.

7) The marketer's server used internal logic and analysis, plus information from the returned cookie from the consumer's browser, to determine what specific ad might be appropriate to serve this particular user for this particular instance.

8) Once this decision is made, the browser is redirected via a HTTP 302 response to the location from which a specific ad (called "creative" in advertising parlance) is to be retrieved. This is typically a CDN.

9) Finally the ad is received from the CDN and displayed by the browser.

The key points to capture from this example are that 1) cookies are essential to each step to identify to the different servers visited various aspects about the user from prior visits so that the content of the ad slot can be personalised, and, presumably, non-repetitious and meaningful advertisements are served, and; 2) that the actual advertisement is unknown at the time of the first request and only identified in the last step after much processing by various entities in the advertising value chain. Moreover, given that this happens to every ad slot on the page, the page as a whole is dynamically generated "on demand", as it were, for a specific user.

Having established the scenario, we now turn to changes to CCN that would be required by our solution to offer the same capabilities but done using the new technology.

Figure 2:
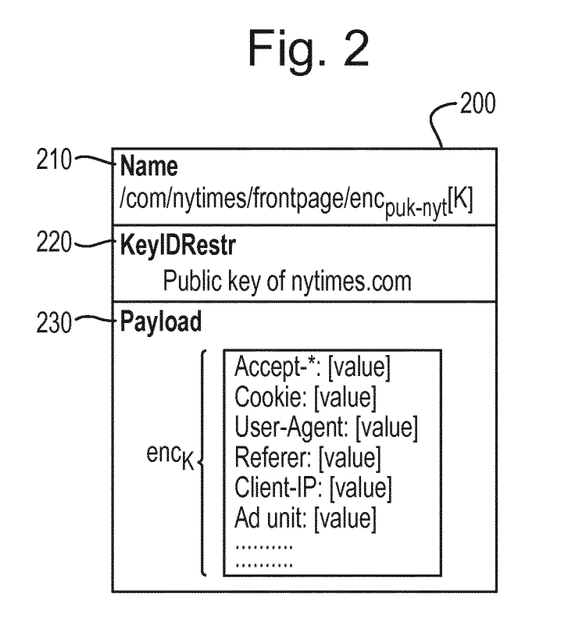
FIG. 2 shows a schematic view of what a CCN Interest message looks like as required for the solution described herein.

FIG. 2 shows a schematic view of what a CCN Interest message 200 looks like as required for the solution described herein. The interest message 200 comprises a Name field 210, a KeyIDRestr field 220, and a Payload field 230.

The Name field 210 of the Interest message 200 contains as a non-routable suffix a random number K encrypted by the public key of the publisher of the named content object. The presence of this suffix makes the name unique and ensures that Interests for /com/nytimes/frontpage from different consumers are not aggregated.

The KeyIDRestr field 220 contains the public key (puk) of the publisher (puk-nyt, in the figure). Its presence ensures, per the CCN specifications, that any returned Content Object can be verified to come from that publisher.

The Payload field 230 is opaque to the CCN protocol, and the application level syntax in this example shows the typical HTTP headers with their values. There are also name-value pairs associated with the ad unit. This is just for illustration purposes, and a different solution might choose different name-value pairs so long as these convey the right information that allows the publisher to take appropriate decisions on what Content Object to return. Our solution, by choosing commonly use HTTP headers, allows for easier integration with current Web applications, which we expect will coexist for the foreseeable future.

Finally, the entire payload is encrypted with the key K. This ensures that no intermediate routers in the path can read the headers, or alter them, providing privacy and integrity. The encryption key, K, can only be retrieved by nytimes.com using its private key.

Figure 3:
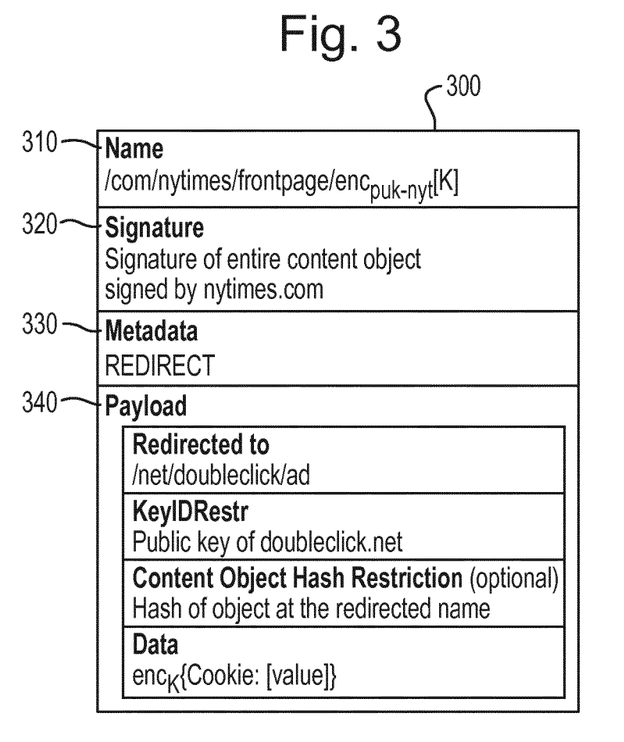
FIG. 3 shows the format of the returned Content Object used for redirection.

FIG. 3 shows the format of the returned Content Object 300 used for redirection, a key aspect of the solution presented herein. The Content Object 300 comprises a name field 310, a signature field 320, a metadata field 330, and a payload field 340.

CCN semantics [1] requires that the name field 310 in the Content Object 300 be identical to that of the Interest. The Signature field 320 contains the signature (the hash of the entire Content Object 300 encrypted with the private key of nytimes.com), required to ensure that the content indeed came from the source indicated by the KeyIDRestr field of the Interest message.

The arrangement presented here adds a new payload type to the Metadata field 330 of the Content Object 300. This new value is "REDIRECT", the name chosen to reflect a specific semantics and different from the two existing values in CCN, "DATA" and "LINK".

This new type of a Content Object 300 has a payload 340 consisting of:
A "Redirected to" parameter which contains a routable Name prefix identifying the producer to whom the redirected Interest should be sent.
A "KeyIdRestr" parameter which provides the public key of the new (redirected to) producer.
An optional Content Object Hash Restriction field, which provides the hash of the content object to be retrieved
A Data field for containing any data that needs to be exchanged between the current requester and the current producer. Cookies, encrypted with the private key that is known only by the producer who generated such data, is an example of what may be carried in this Data field.

Figure 4:
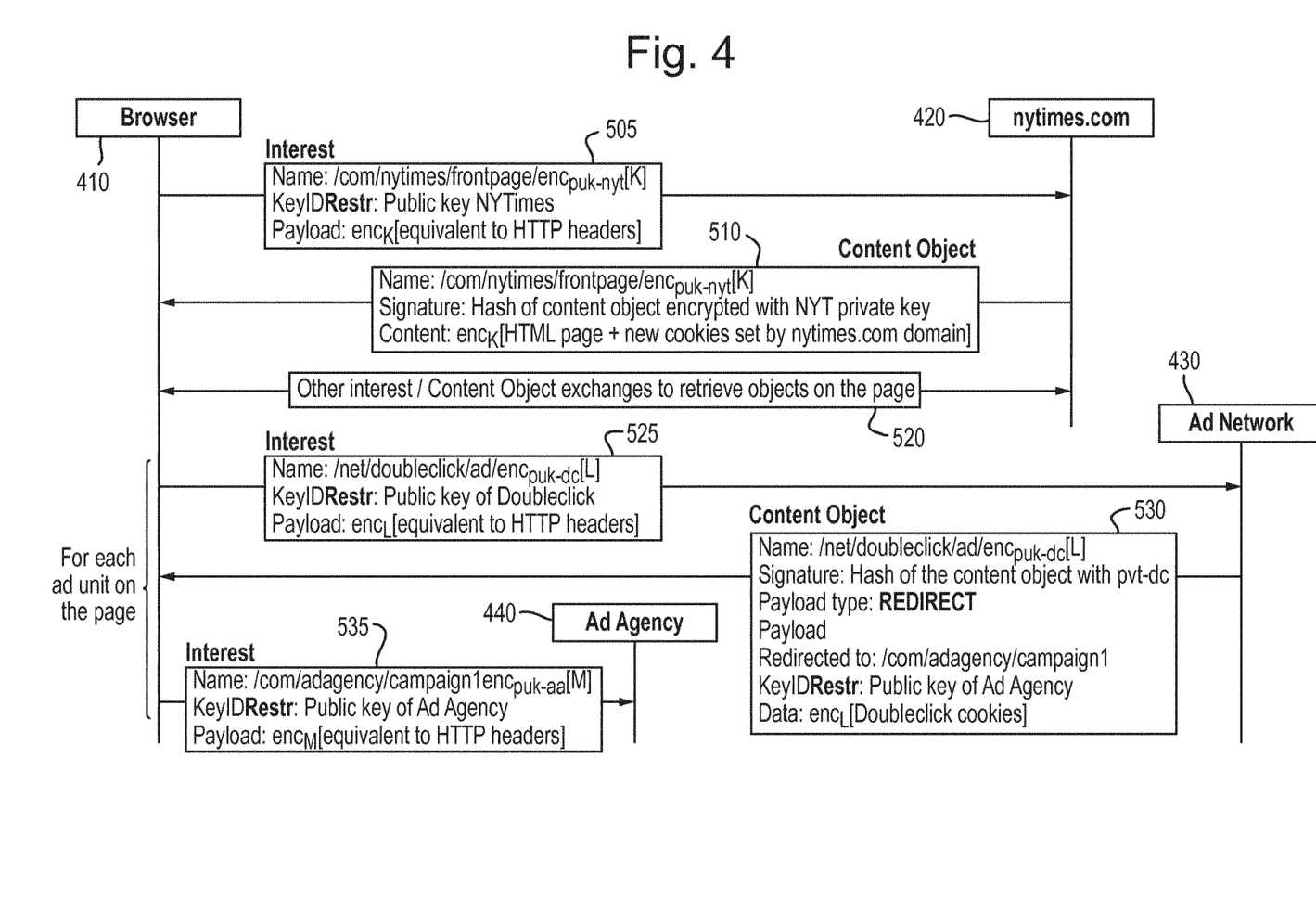
FIG. 4 shows the message exchange during the first redirection of a typical ad unit on a webpage.

FIG. 4 shows the message exchange during the first redirection of a typical ad unit on a webpage. These illustrate a process that corresponds to that of steps (1) through (5) in FIG. 1, but now done in an information centric network using the new messages presented above. The nodes shown in FIG. 4 are a browser 410 in a CCN-enabled originating node, a content server 420, in this example nytimes.com, an ad network 430, and an ad agency 440.

The steps are as follows:
1) An Interest 505, formatted as described in relation to FIG. 2, is sent from the protocol stack underlying the consumer's browser 410 to fetch the named content item /com/nytimes/frontpage/enc$_{puk-nyt}$, where a random number, K, is encrypted with the public key of nytimes.com (puk-nyt). The Interest 505 includes the public key of nytimes.com in the KeyIDRestr field, while the relevant metadata (HTTP headers fields, as name value pairs) is sent in payload field, encrypted with the random number K. Cookies from the nytimes.com domain are included in one of these name-value pairs.

2) The returned Content Object 510 is formatted as described above. The payload is the web page's HTML to be rendered by the browser 410, together with any cookies from the nytimes.com 420 domain. To structure the content in the payload, MIME encoding can be used in a similar way that is done for the Named Data Objects (NDO) in the NetInf Protocol Specification [3]. The content is encrypted with the same key K, thus ensuring privacy and integrity of the content during transit.

3) As the HTML is parsed, there can be several Interest/Content Object exchanges 520 to retrieve various objects (images, text, icons, JavaScript, etc.) from the page. We single out below the retrieval of content associated with the ad units contained within HTML <iframe>s.

4) For each ad until on the page, contained within an <iframe>, an Interest 525 is sent to the source identified, which is the publisher's ad network doubleclick.net 430 in this example, with a non-routable suffix containing a random number, L, encrypted with doubleclick.net's public key (puk-dc). The Interest 525 contains appropriate headers in the payload, including cookies for the doubleclick.net domain 430.

5) The Content Object 530 returned by the Ad Network 430 uses the new redirection indicator as described with reference to FIG. 3, identifying the name to which an Interest should be directed as well as the public key of that publisher (the ad agency 440).

6) A new Interest 535 is directed to the named object /com/adagency/campaign1/enc$_{puk-aa}$[M], where the non-routable suffix is a new random number, M, encrypted with the public key of the ad agency (puk-aa).

Figure 5:
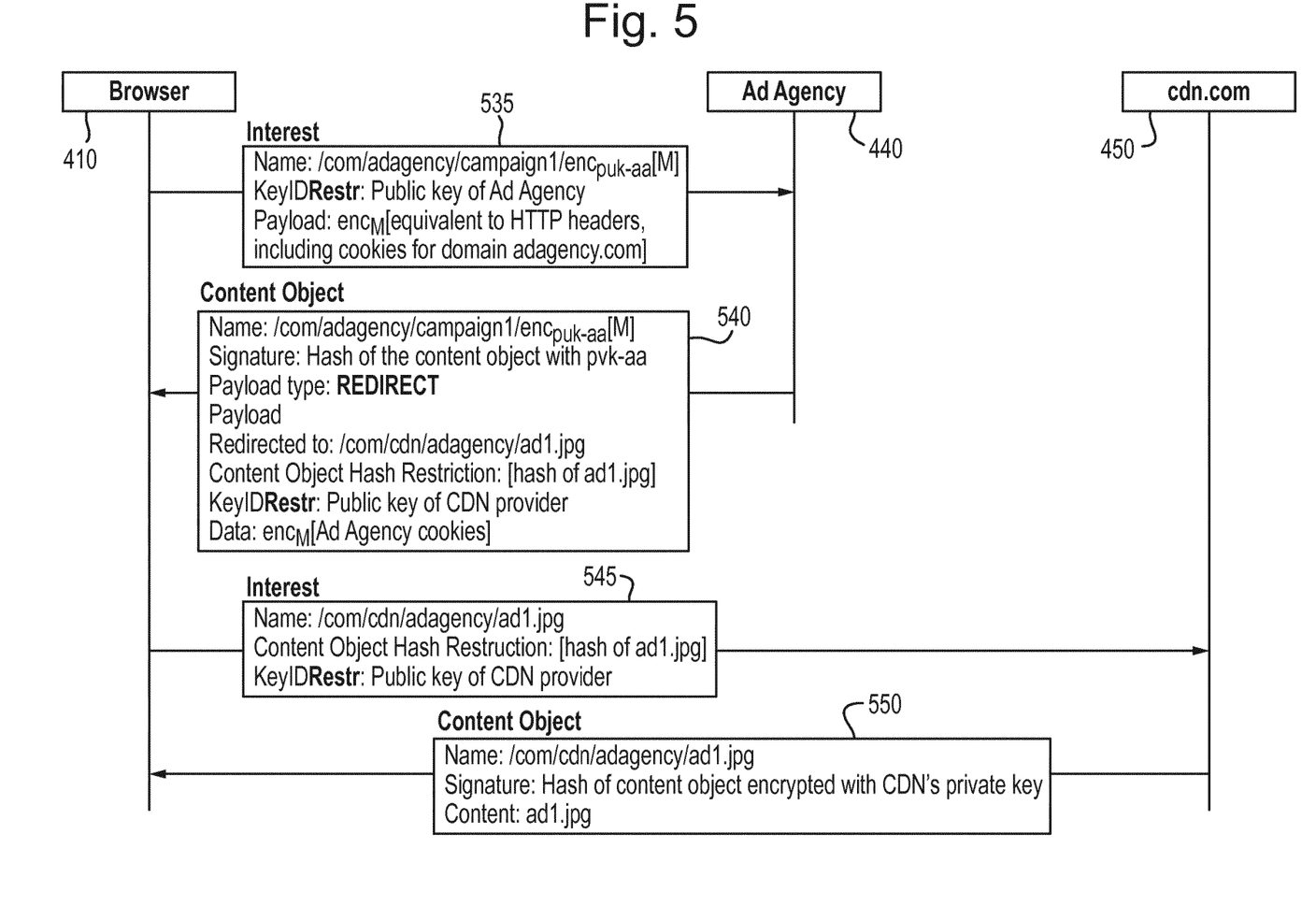
FIG. 5 is a continuation of FIG. 4, showing additional steps in the process performed in an information centric network.

FIG. 5 shows the remaining steps for completeness. This part of the process corresponds to steps 5 through 10 of FIG. 1, but performed here in an information centric network using the message formats presented herein. FIG. 5 shows the browser 410 and ad agency 440 of FIG. 4, and also includes the cdn.com 450 where the ad that is presented is stored. Note that the first step of FIG. 5 is the same as the last step of FIG. 4, which is a new Interest 535 directed to the named object /com/adagency/campaign1/enc$_{puk-aa}$[M], where the non-routable suffix is a new random number, M, encrypted with the public key of the ad agency (puk-aa).

The Ad Agency 440 chooses which advertisement should fill the specific ad slot for this user on this web page. To ensure that there is no substitution, it includes the hash of the object in the Content Object Hash Restriction (COHR) field of the Content Object 540 with the Redirection indicator. This COHR field is carried in the Interest 545 redirected to the CDN 450 and sent from the browser 410, which ensures that the indicated named object with the matching hash is returned, which occurs by way of content object 550 being delivered from CDN 450 to the browser 410.

The use of the COHR in this step allows an important check which is missing in current advertising practice, where it is possible for malicious or inappropriate content to be substituted in place of an advertisement. There have been instances where advertisements have been replaced with malicious code in the CDN and thus loaded via a consumer's browser. There are no obvious technical means to prevent this sort of exploit in current practice. The use of COHR in the REDIRECT content object offers a way to solve this.

The solution presented herein applies to both CCN usage and CCN message syntax/semantics:

Usage: While adding metadata to names or payloads of Interest messages have been described in ICN literature, a complete solution for how to carry cookies and other relevant HTTP headers has not been described. If there is to be common way for web pages to support online advertising, there needs to be a common way for how to create names for dynamic content generated on-the-fly, how to protect customer-related metadata in transit, how to ensure that the advertisement returned is both integrity protected and from the correct entity, and how to do the multiple redirections needed for the interactions with components of the advertising chain.

Message syntax/semantics: A new type of Content Object message is provided to redirect a content request for a named object to another publisher. The REDIRECT data type has richer semantics than the currently defined LINK type, as it allows for referencing an object that has not yet been created. Without such a redirection message, it is not clear how CCN could be used in the online advertising scenario described. Needless to say, redirection is not just for online advertising but used in a large number of web applications. Thus, this new message type has greater applicability than suggested by the example we chose to illustrate its use.

Figure 6:
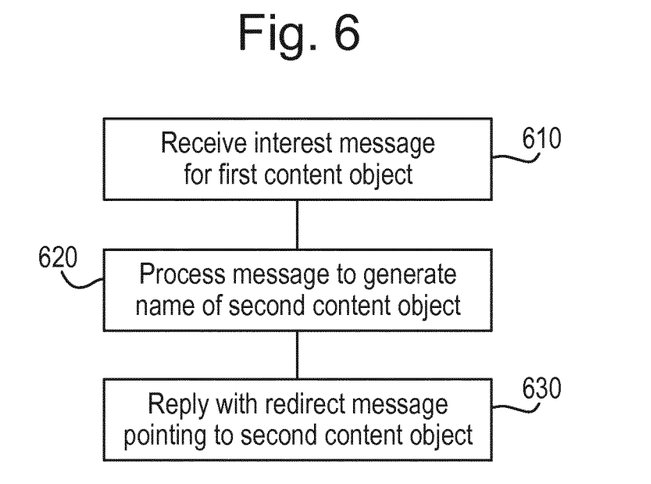
FIG. 6 illustrates a method in a serving node of an information centric network.

FIG. 6 illustrates a method in a serving node of an information centric network, the method comprising: receiving 610 an interest message referring to a first content object from a requesting node. The method further comprises processing 620 the name of the first content object and the payload of the received interest message to generate the name of a second content object; and replying 630 to the interest message with a redirect message, wherein the redirect message comprises the name of the second content object.

This allows a node in an information centric network to process a request and redirect the requesting node to another node. The redirection to another node is performed by giving the requesting node a redirect message referencing the name of a second content object, which the network knows to retrieve from the another node. Importantly, neither the name of the first content object nor the name of the second content object need refer to an actual content object, these names are merely required to cause the request to arrive at the serving node. To this end, the content object names may include a unique identifier, such as a hash of the payload to render the requested content object unique and so ensure that the request arrives at a serving node and is not answered from the cache of an intermediate node.

The redirect message may further comprise at least one of: a data field for exchanging information between the serving node and the requesting node; the public key of the publisher of the second content object; and a cryptographic hash of the second content object. The serving node receives interest messages from a requesting node, that requesting node may have received the interest message from another node in a long chain of communication. The originating node is the first requester in the case where there is a chain of redirections. The node that created the first interest message in the communication chain is the originating node.

A cryptographic hash of the second content object can be included when the serving node knows what the second content object is. Once the requesting node has received the second content object, from some other node, it can apply the same cryptographic hash function to the received second object and compare this to the cryptographic hash received from the serving node. In this way the second content object can be verified as being the specific one requested. The serving node may not know exactly what the second content object is if the name of the second content object is merely used to carry redirection information to the requesting node and does not refer to an actual object.

The data field for exchanging information between the serving node and the originating node may comprise at least one of: the identity of the requesting node; the identity of the originating node; the capabilities of the originating node; and state information exchanged during the last interaction between the requesting node and the serving node.

Figure 7:
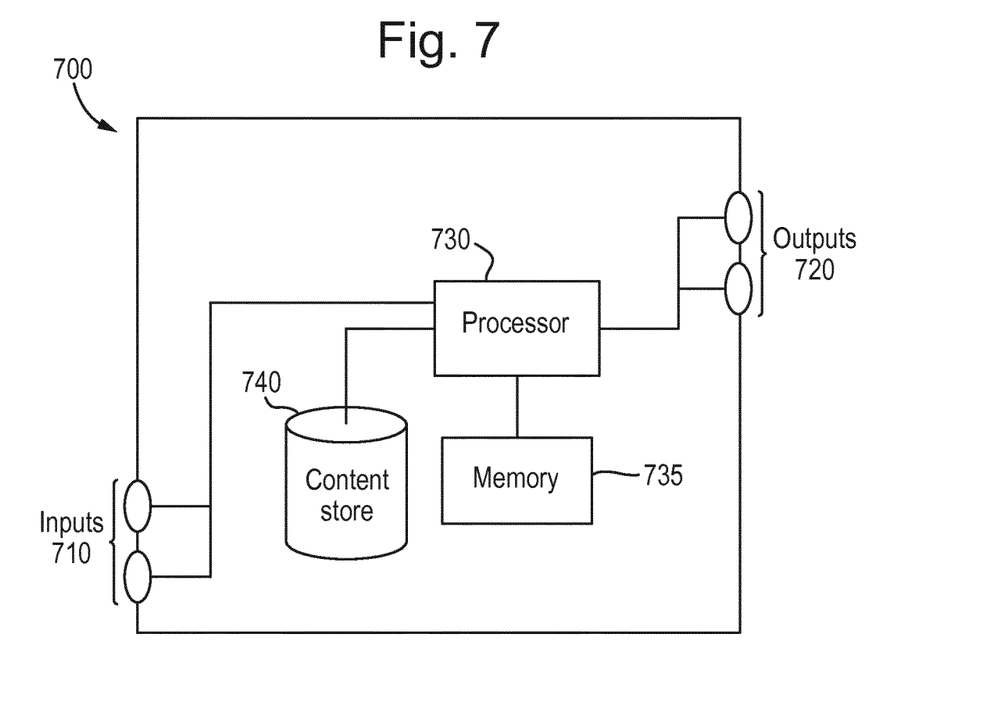
FIG. 7 illustrates a serving node of an information centric network.

FIG. 7 illustrates a serving node 700 of an information centric network, the serving node comprising an interface 710, 720, a processor 730, and a local content store 740.

The serving node 700 is arranged to receive an interest message on the interface 710, the interest message referring to a first content object and received from a requesting node. The serving node 700 is further arranged to process the name of the first content object and the payload of the received interest message in the processor 730 to generate the name of a second content object. The serving node 700 is further arranged to reply to the interest message via the interface 720 with a redirect message, wherein the redirect message comprises the name of the second content object.

The redirect message may further comprise at least one of: a data field for exchanging information between the serving node and the requesting node; the public key of the publisher of the second content object; and a cryptographic hash of the named content object.

There is further provided a method in a requesting node of an information centric network, the method comprising: sending an interest message referring to a first named content object; receiving a redirect message in reply, wherein the redirect message comprises the name of a second content object; and sending a new interest message to retrieve the second content object.

The received redirect message may further comprise the name of a content object, the public key of the publisher of the second content object and a cryptographic hash of the named content object. The method may further comprise receiving the second content object from the another node; and using the public key received in the redirect message to authenticate the publisher of the second content object. The method may further comprise receiving the named content object from the another node; and using the cryptographic hash to authenticate verify that the received named content object is the same as the one identified in the received redirect message.

There is further provided a computer-readable medium, carrying instructions, which, when executed by computer logic, causes said computer logic to carry out any of the methods defined herein.

Figure 8:
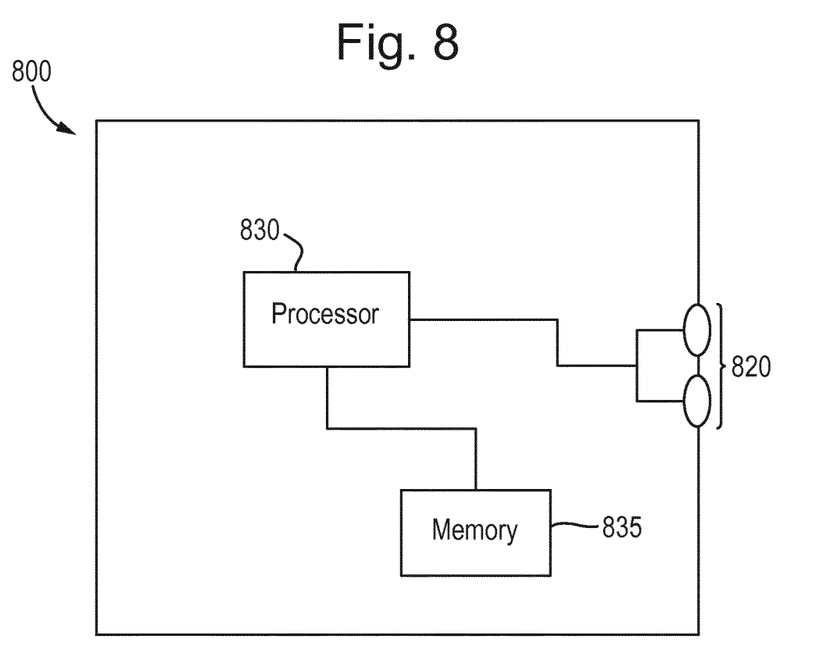
FIG. 8 illustrates a requesting node of an information centric network.

FIG. 8 illustrates a requesting node 800 of an information centric network, the requesting node 800 comprising an interface 820, and a processor 830, the requesting node arranged to: send an interest message via the interface 820, the interest message referring to a first content object; receive via the interface 820 a redirect message in reply to the interest message, wherein the redirect message comprises the name of a second content object; and send a new interest message via the interface 820, the new interest message referring to the second content object.

The processor 830 is arranged to receive instructions which, when executed, causes the processor 830 to carry out the above described method. The instructions may be stored on a memory 835.

The received redirect message may further comprise the name of a content object and the public key of the publisher of the second content object, the requesting node further arranged to: receive the second content object from the another node via the interface; and use the public key contained in the received redirect message to authenticate the identity of the publisher of the second content object.

The received redirect message may further comprise the name of a content object and a cryptographic hash of the named content object, the requesting node further arranged to: receive the named content object from the another node via the interface; and use the cryptographic hash in the processor to verify that the received named content object is the same as the one identified in the received redirect message.

There is further provided a method in a serving node of an information centric network, the method comprising: receiving an interest message referring to a named content object from a requesting node; and replying to the interest message with a redirect message, wherein the redirect message comprises the name of another node to which the interest message should be directed.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The above described method may be embodied in a set of instructions, stored on a computer readable medium, which when loaded into a computer processor, Digital Signal Processor (DSP) or similar, causes the processor to carry out the hereinbefore described methods of requesting or sending named content items in an information centric network. Equally, the method may be embodied as a specially programmed, or hardware designed, integrated circuit which operates to carry out the method on video data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

Another exemplary hardware embodiment of the present invention is that of a node in an information centric network comprising an Application Specific Integrated Circuit (ASIC). The client node may be a user apparatus. The client node may be any kind of personal computer such as a television, a smart television, a set-top box, a games-console, a home-theatre personal computer, a tablet, a smart-phone, a laptop, or even a desktop PC.

Further, while examples have been given in the context of particular communications standards, these examples are not intended to be the limit of the communications standards to which the disclosed method and apparatus may be applied. For example, while specific examples have been given in the context of CCN, the principles disclosed herein can also be applied to any information centric communication network.

REFERENCES

[1] CCNx Semantics: https://toolsaetf.org/html/draft-irtf-icnrg-ccnxsemantics-01
[2] CCN Messages in TLV Format: http://toolsaetf.org/html/draft-irtf-icnrg-ccnxmessages-01
[3] D. Kutscher, S. Farrell, E. Davies, "The NetInf Protocol", draft-kutscher-icnrg-netinf-proto-00, https://toolsaetf.org/pdf/draft-kutscher-icnrg-netinf-proto-00.pdf, Oct. 4, 2012

The invention claimed is:

1. A method in a serving node of an information centric network, the method comprising:
   receiving an interest message referring to a first content object from a requesting node;
   processing the name of the first content object and the payload of the received interest message to generate the name of a second content object; and
   replying to the interest message with a redirect message, wherein the redirect message comprises the name of the second content object.

2. The method of claim 1, wherein the redirect message further comprises:
   a data field for exchanging information between the serving node and the originating node;
   the public key of the publisher of the second content object; and/or
   a cryptographic hash of the second content object.

3. The method of claim 2, wherein the data field for exchanging information between the serving node and the originating node comprises:
   the identity of the requesting node;
   the identity of the originating node;
   the capabilities of the originating node; and/or
   state information exchanged during the interaction between the requesting node and the serving node.

4. A non-transitory computer-readable medium storing instructions which when executed by computers logic causes said computer logic to carry out the method of claim 1.

5. A serving node of an information centric network, the serving node comprising an interface, a processor, and a local content store, the serving node arranged to:
   receive an interest message on the interface, the interest message referring to a first content object and received from a requesting node;
   process the name of the first content object and the payload of the received interest message in the processor to generate the name of a second content object; and
   reply to the interest message via the interface with a redirect message, wherein the redirect message comprises the name of the second content object.

6. The serving node of claim 5, wherein the redirect message further comprises:
   a data field for exchanging information between the serving node and the requesting node;
   the public key of the publisher of the second content object; and/or
   a cryptographic hash of the second content object.

7. A method in a requesting node of an information centric network, the method comprising:
- sending an interest message referring to a first named content object;
- receiving a redirect message in reply, wherein the redirect message comprises the name of a second content object; and
- sending a new interest message to retrieve the second content object.

8. The method of claim 7, wherein the received redirect message further comprises the name of a content object and a cryptographic hash of the named content object, the method further comprising:
- receiving the named content object from the another node; and
- using the cryptographic hash to authenticate verify that the received named content object is the same as the one identified in the received redirect message.

9. A non-transitory computer-readable medium, carrying instructions, which, when executed by computer logic, causes said computer logic to carry out the method of claim 7.

10. A requesting node of an information centric network, the requesting node comprising an interface, and a processor, the requesting node arranged to:
- send an interest message via the interface, the interest message referring to a first content object;
- receive via the interface a redirect message in reply to the interest message, wherein the redirect message comprises the name of a second content object; and
- send a new interest message via the interface, the new interest message referring to the second content object.

11. The requesting node of claim 10, wherein the received redirect message further comprises the name of a content object and a cryptographic hash of the named content object, the requesting node further arranged to:
- receive the named content object from the another node via the interface; and
- use the cryptographic hash in the processor to verify that the received named content object is the same as the one identified in the received redirect message.

12. The requesting node of claim 10, wherein the received redirect message further comprises the name of a content object and the public key of the publisher of the second content object, the requesting node further arranged to:
- receive the named content object from the another node via the interface; and
- use the public-key contained in the received redirect message to authenticate the identity of the publisher of the second content object.

13. A method in a serving node of an information centric network, the method comprising:
- receiving an interest message referring to a named content object from a requesting node; and
- replying to the interest message with a redirect message, wherein the redirect message comprises the name of another node to which the interest message should be directed.

* * * * *